United States Patent [19]
Jocsak

[11] 3,844,588
[45] Oct. 29, 1974

[54] CONDENSER TUBE SUPPORT PLATE INSERT

[75] Inventor: William Jocsak, Easton, Pa.

[73] Assignee: Ingersoll-Rand Company, Woodcliff Lake, N.J.

[22] Filed: June 21, 1972

[21] Appl. No.: 264,737

[52] U.S. Cl. .................. 285/162, 248/56, 285/192, 285/DIG. 22, 403/197
[51] Int. Cl. ............................................. F16l 5/02
[58] Field of Search ......... 248/56, 68 R; 174/152 G, 174/153 G; 138/112; 165/69, 162, 173; 16/2; 285/138, 158, 192, 162, DIG. 22; 277/178; 339/103 B; 122/235 G; 403/197

[56] References Cited
UNITED STATES PATENTS

| | | | |
|---|---|---|---|
| 684,909 | 10/1901 | Cole | 174/153 G |
| 2,542,442 | 2/1951 | Weber | 248/68 R |
| 2,664,458 | 12/1953 | Rapata | 174/153 G |
| 2,897,533 | 8/1959 | Bull et al. | 248/56 X |
| 2,956,468 | 10/1960 | Macy | 16/2 |
| 3,090,115 | 5/1963 | Carr | 174/153 G |
| 3,552,754 | 1/1971 | Bow | 285/192 X |
| 3,559,730 | 2/1971 | Denjean | 248/56 X |
| 3,562,847 | 2/1971 | Jemison | 248/56 X |
| 3,572,770 | 3/1971 | Kagi | 285/158 |

Primary Examiner—Roy D. Frazier
Assistant Examiner—Rodney H. Bonck
Attorney, Agent, or Firm—Frank S. Troidl

[57] ABSTRACT

Apparatus for facilitating assembly of and protecting condenser tubes in tube support plates. The apparatus is a flexible insert placed into the support plate holes prior to assembly of the condenser tubes, including a flange and projection adapted to prevent axial movement of the insert relative to the support plate and dimensioned to minimize transverse movement of condenser tubes within the support plate hole.

4 Claims, 3 Drawing Figures

CONDENSER TUBE SUPPORT PLATE INSERT

BACKGROUND OF THE INVENTION

This invention relates to flexible inserts for use with steam condenser tube support plates and is particularly concerned with a sleeve that facilitates assembly of condenser tubes in the plates and protect them after assembly.

The typical steam condenser for industrial applications has large numbers of tubes supported by plates. The holes in the tube support plates which accommodate the tubes require close tolerances and a deburring operation. The close tolerances are necessary to reduce the tendency of tubes to vibrate during condenser operation. Burrs from the drilling operation, shot peening or "butterflying" (which is a rust removal from the hole by a rotating wire brush) must be removed as they make the assembly of tubes difficult and create scratches on the tubes which serve as corrosion sites that contribute to early failure of the tubes.

The object of this invention is to eliminate the need for deburring or chamfering the holes in the support plates. Another object is to eliminate the need for reworking of holes due to damage from shot-peening or similar operations. Another object of this invention is to eliminate the butterflying operation which is often done in the field. A further object is to facilitate faster drilling and permit rougher finishes and greater tolerances in the drilling of holes. Another objective is to reduce the vibration of tubes which leads to wear and eventual rupture. Still another object is to eliminate scratching of tubes during assembly. These objects are all served by providing a soft insert of flexible material in each hole of every support plate. These inserts can be quickly and inexpensively placed, and accommodate the irregularities that heretofore have required expensive finishing operations.

The invention as well as its advantages may be further understood by reference to the following detailed description and drawings in which.

Figure 1:
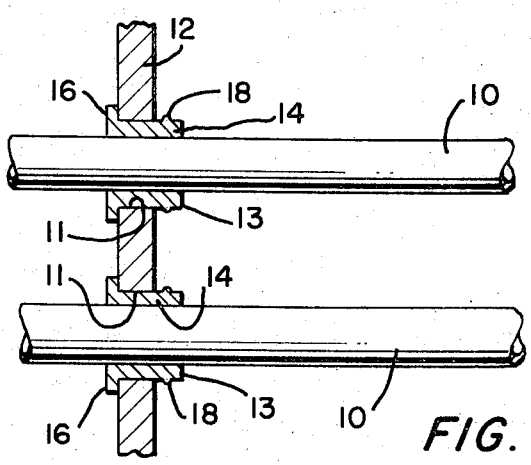
FIG. 1 is a partial section of a condenser tube support plate showing two tubes and inserts positioned therein.

Referring to the drawings and particularly to FIG. 1 condenser tubes 10 are located in holes 11 in support plate 12 but do not contact the plate because of the interpositioning of flexible insert 13 having a body 14, a flange 16 at one end, and a plurality of projections 18 near the other end. In the modification shown in FIG. 2 the projection 20 is an annular expansion of the insert. FIG. 3 depicts a further modification in which the body 14' of the insert has an axial cut 22 progressing from the end having the projections 20'.

In operation the inserts 13 are placed into loosely toleranced holes 11 in the support plates 12. Although the outside diameter of the inserts at the projection 18 (or 20) is greater than inside diameter of the holes, the flexibility of the insert material permits compression of the insert until the projection clears the hole and springs outwardly. The body 14 fits loosely in the hole, but projections 18 and flange 16 prevent significant axial movement. Condenser tubes 10 having the conventional assembly points for ease of insertion, are pushed through the inserts 13 from the flange end causing the bodies 14 to expand sufficiently to provide a snug fit.

Figure 2:
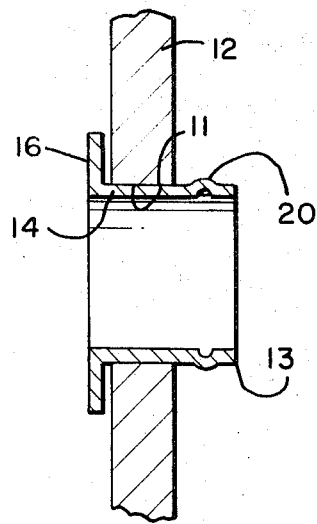
FIG. 2 is an enlarged cross-section of a modification of the insert in place in a support plate.
Figure 3:
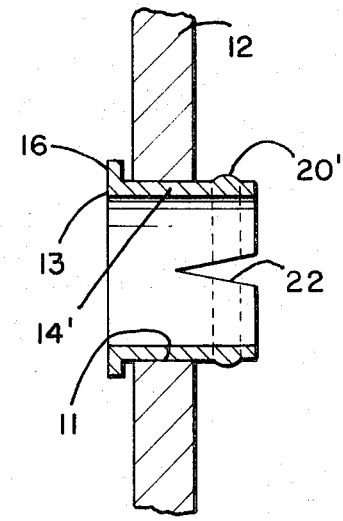
FIG. 3 is another modification of the insert shown in section. Like parts throughout the various drawings are referred to by like numbers.

As noted, the projections may be one or a plurality of discrete bumps shown as 18 in FIG. 1, an annular expansion of the diameter as indicated at 20 in FIG. 2, or an annular prominence like that of 20' in FIG. 3. If a less flexible or compressible material is selected, the insert can be made more resilient and accommodating of installation by the provision of one or more of the priorly described cuts 22 (FIG. 3). Thus, when projection 20' (or 18 or 20) is forced radially inwardly by the hole 11, the cut 22 will accommodate the contraction of the material until the projection clears the hole and is able to spring back.

When a condenser tube 10 is pushed through an insertlined hole 11 in a support plate 12 the flange 16 prevents dislodging of the insert 13. Any reverse movement of the tube 10 during assembly will not remove the insert 13 from the hole 11 because the projections inhibit axial movement in that direction. Close tolerances of support plate holes 11 are no longer necessary because slightly smaller holes will be expansible through the plasticity of the insert material, and slightly larger holes will substantially close upon the tube due to the resilience of the insert. Irregularities of the holes, such as burrs due to drilling or shot peening operations will no longer damage the tubes as they are protected by the inserts. The easier tolerances and the protection of the insert further permit elimination of the "butterflying" operation which is a rust removal from the holes by insertion of a revolving wire brush. In addition, many plastic materials available for making the inserts feature low coefficients of friction, thereby making tube assembly easier.

In view of the above it will be seen that the several objects of the invention are achieved and other advantageous results obtained. As various changes could be made in the above constructions such as changes in shape and location of projections or cut-out portions without departing from the scope of the invention it is intended that all matter contained in the above description or shown in the accompanying drawings shall be interpreted as illustrative and not in a limiting sense.

I claim:

1. In combination: a condenser support plate having at least one condenser tube support hole formed through the condenser support plate;

a flexible, axially extending insert positioned in the condenser tube support hole and in contact with the wall of said support hole; and having an axially extending hole having the same diameter throughout its length formed therethrough; a condenser tube inserted through the insert, and in contact with the wall of said axially extending hole said insert having the same outside diameter along substantially its entire length and also having first and second end portions, relative the axis thereof, for projection thereof from opposite sides of the support plate, and an intermediate portion positioned in the tube support hole, the length of the intermediate portion of the insert being more than the length of the condenser tube support hole, and the outside diameter of the intermediate portion being such that the insert fitted loosely in the tube support hole when the insert was inserted in the hole, and the diameter of the axially extending bore in the insert and the flexibility of the insert being such that the intermediate portion was expanded along its entire length to provide a snug fit in the support plate hole when the condenser tube was inserted in the insert;

a flange integral with said first end portion; and at least one convex bump on said second end portion adapted to be compressed to permit the insertion of the flexible insert into the support plate hole and thereafter inhibit the axial movement of said insert relative to the support plate, the convex bump having an external diameter greater than the external diameter of the intermediate portion before and after the insertion of the insert into the support plate hole.

2. The combination of claim 1 wherein the convex bump comprises an annular section integral with the second end portion.

3. The combination of claim 1 wherein there are a plurality of discrete convex bumps circumferentially spaced equi-distant from said flange.

4. The combination of claim 1 further comprising an axially extending slot throughout the second end portion of the insert.

* * * * *